3,267,752
DRIVE SYSTEM FOR RECIPROCATING
AN ELEMENT
Walter Hauser-Bucher, Zurich, Switzerland, assignor to Bucher-Guyer A.G. Maschinenfabrik, Niederweningen, Switzerland
Filed Feb. 11, 1964, Ser. No. 344,118
Claims priority, application Switzerland, Feb. 14, 1963, 1,884/63
14 Claims. (Cl. 74—99)

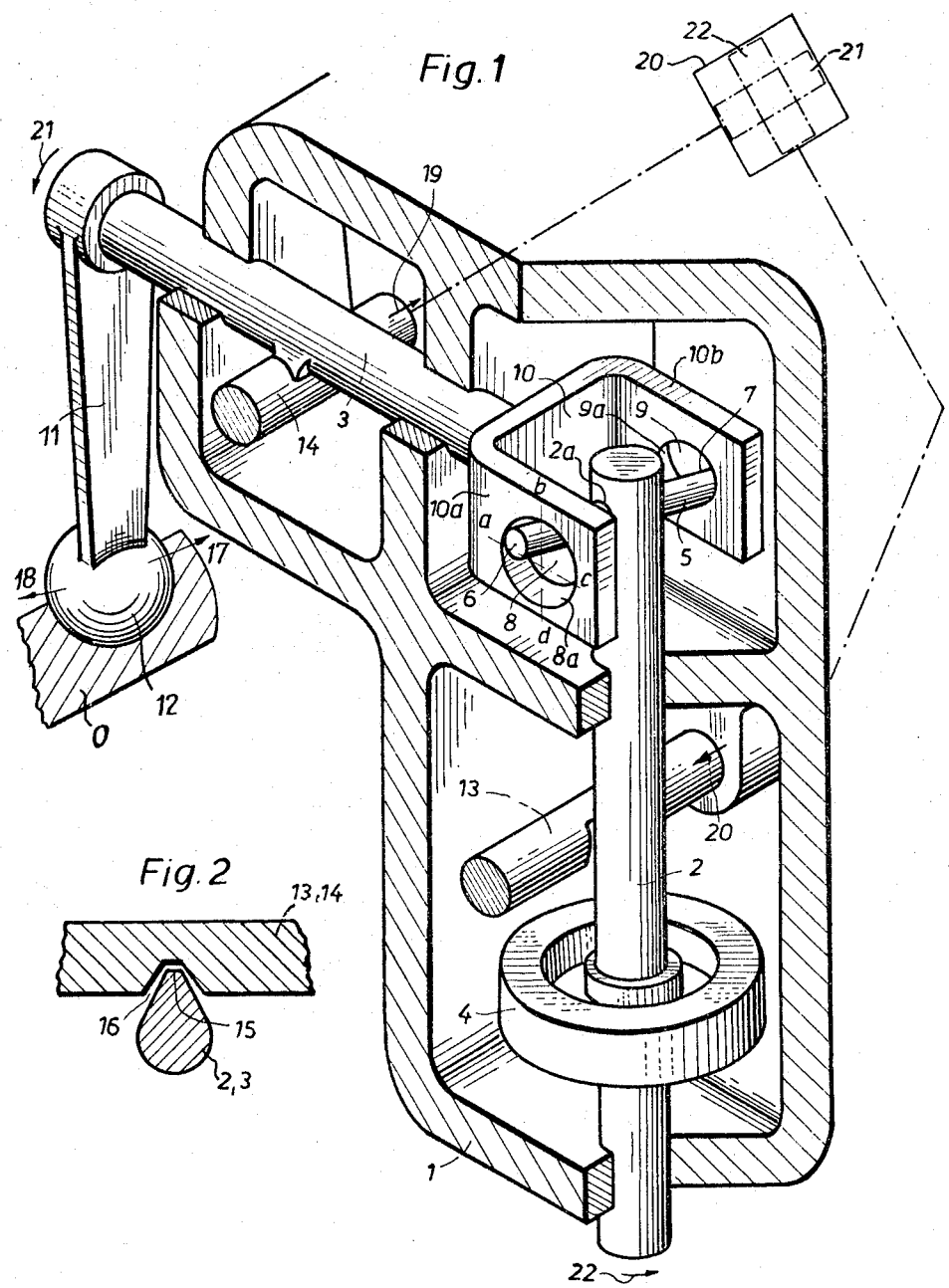

The present invention broadly has reference to an improved system for reciprocating an element and, furthermore, pertains to an improved drive system for reciprocating an element wherein a pair of shaft members, one of which carries said element, are oscillated at the same frequency but out of phase, and are interconnected by an improved coupling mechanism.

In my co-pending United States application Serial No. 199,289, filed June 1, 1962, entitled, "Drive System for Reciprocating Members," I have taught and disclosed an improved drive system for the reciprocation of an element or mass which cooperates with a gyrating mass or flywheel moving with the same oscillation frequency, and wherein the element and flywheel in their mutual movements are phase displaced. In accordance with one modification disclosed therein the element and flywheel are displaceably guided in crosswise intersecting directions and coupled to one another through the agency of an eccentric.

The present invention relates to a further embodiment of drive system for the reciprocation of an element in accordance with the principles of the aforesaid co-pending application. The drive system of the present invention, in accordance with a preferred illustrative embodiment, likewise provides for the reciprocation of an element or mass cooperating with a gyrating mass moving with the same oscillation frequency as the operable element, and wherein operable element and gyrating mass are phase displaced in their movements. In the improved drive system of the present invention such operable element and gyrating mass are coupled together by means of a spatial or three-dimensional crank. By way of example, the three-dimensional crank can be constructed to provide what may be conveniently considered herein as a cross-slide drive.

More specifically, the inventive drive system for reciprocating an operable element comprises means for supporting the operable element for reciprocatory motion and drive means cooperating with the supporting means for reciprocating the operable element at a predetermined rate of reciprocatory motion. Additionally, there is provided an oscillatory fly weight and means operatively coupling said fly weight to the supporting means for reciprocating the fly weight at the aforesaid predetermined rate of reciprocatory motion of the operable element and at a predetermined relative phase displacement with respect to the reciprocatory motion of the operable element. According to the teachings of the invention, the previously mentioned coupling means comprises at least two cooperating power transmitting coupling elements coacting with play, each of which elements are mounted for movement along a respective path enclosing an angle with respect to one another. The invention contemplates that one such coupling element is provided with a hole and the other coupling element embodies a pin piercingly extending with play into the aforesaid hole. By virtue of this arrangement, not only is there provided phase displacement between operable element and fly weight, but furthermore, the operable element can automatically reverse its motion at any time during its operating cycle should such operable element be prevented by an external force from completing its reciprocatory motion in a given direction.

In accordance with an advantageous embodiment the operable element and gyrating mass or fly weight are each connected with a shaft member, one such shaft member carrying one coupling element, e.g., in the form of a bifurcated or forked member having at least one aforementioned hole and the other such shaft member the other coupling element in the form of the aforementioned pin which operably engages with play in the hole of the aforesaid bifurcated member in order to provide the desired coupling connection between such shafts. According to a further feature of the invention, it is advantageous if the coupling between operable element and gyrating mass is effected at the region of intersection of the axes of the shaft members preferably disposed at right angles to one another.

The pair of shaft members can each by driven by a double-acting hydraulic piston for example, wherein each hydraulic piston is advantageously disposed at right angles to its associated shaft member. Moreover, it is possible to utilize a rack drive or equivalent structure to obtain the operable or working connection between the aforesaid hydraulic pistons and the respective shafts in driven association therewith.

Accordingly, the present invention has as one of its primary objects to provide an improved arrangement for reciprocating an element cooperating with a gyrating mass moving with the same oscillation frequency but out of phase with the aforesaid element, including means for positively coupling together such element and gyrating mass to provide for high operating speeds as well as, of course, reliable interconnection and working thereof.

A further important object of this invention is to provide an improved drive system incorporating a pair of oscillating shaft members and coupling means for reliably operably coupling together such shaft members.

Still another important object of this invention resides in the provision of improved coupling means incorporating a member carried at one shaft and a pin carried at another shaft slidably engaging with said member in order to provide positive coupling action between such shafts.

Yet a further very important object of this invention is to provide an improved drive system for reciprocating an element in such a manner that the inertia forces resulting from a driven gyrating mass are chiefly operable at such time as they are actually desired and useful.

Another important object of this invention is the provision of an improved drive system for reciprocating a mass disposed upon a shaft member, such system further including a further shaft member operably coupled with said mass-carrying shaft member, and means for driving at least said further shaft member, wherein said shaft members oscillate at the same frequency but out of phase.

Still a further considerable object of this invention is concerned with an improved drive system incorporating coupling means for reciprocating an operable element and gyrating mass or fly weight at the same frequency but phase displaced and for automatically reversing the movement of the operable element whenever it encounters an external force which prevents its further movement in a given direction.

Other features, objects and advantages of the invention will become apparent by reference to the following detailed description and drawing in which:

FIGURE 1 is a perspective view of a drive system of the present invention for reciprocating an operable element cooperating with a gyrating mass or fly weight moving with the same oscillation frequency and wherein the element and gyrating mass in their mutual movements are phase displaced, and further illustrating details of the improved coupling arrangement for operably coupling together the operable element and gyrating mass; and FIGURE 2 is a fragmentary view illustrating details of the shaft members of the drive arrangement and associated rack-like drive.

In describing the invention a preferred arrangement of the components of the drive system will be set forth in order to illustrate the principles of the invention. It is to be distinctly understood, however, that the illustrated arrangement is given by way of example only, and is capable of modification without departing from the underlying principles of the invention. Accordingly, as the description proceeds certain such various possible modifications will be indicated.

Describing now the drawing, in FIGURE 1 there is shown a housing 1 having a portion of its wall broken away to reveal the interior thereof. This housing 1 supports a pair of shafts 2 and 3 shown, in the present instance, to be disposed in a common plane and mounted at right angles to one another. The shaft 2 will hereinafter be designated as an oscillating shaft due to the nature of its movement, and supports a gyrating mass or fly weight incorporating a disk 4, hereinafter conveniently designated as a fly weight or flywheel mass 4. The oscillating shaft 2 is provided at its upper end with a transverse bore 2a through which piercingly extends with play one coupling element, e.g., in the form of an elongated pin or bolt 5. The diametrically opposed ends 6 and 7 of the pin or bolt 5 extend with play at all sides thereof into holes or openings 8 and 9, respectively, provided at the confronting legs 10a and 10b of a further coupling element, e.g., in the form of a bifurcated member 10, such bifurcated member 10 and bolt 5 being advantageously disposed, in the present case, at the zone of intersection of the longitudinal axes of shafts 2, 3. The openings 8 and 9 are here shown bounded by inclined walls 8a and 9a, respectively, which in the present embodiment define substantially cone-shaped openings 8, 9. The bifurcated or forked member 10 is connected with the other shaft 3, hereinafter referred to as the drive shaft 3 since such is employed in the present arrangement to drive an operable element or mass (not shown). At this point it should be mentioned, and as should become apparent as the description proceeds, the bifurcated member could be mounted at the oscillating shaft 2 and the pin member 5 at the drive shaft 3. Moreover, it will be apparent that the pin 5 is supported at the shaft 2 for movement along a given path a–c, and the holes 8, 9 of the member 10 are supported at the shaft 3 for movement along a given path b–d, both such paths enclosing an angle with one another, which in the case considered amounts to about 90°.

It will further be seen that an oscillating or swivel arm 11 is arranged at the other end of the drive shaft 3 remote from the end carrying the bifurcated member 10. This swivel arm 11 is operatively associated with the operable element or mass 0 to be reciprocated through the agency of a spherical joint 12. Such operable element may, for example be a mower cutter of the type shown in my aforementioned copending U.S. patent application.

The illustrated drive system further incorporates drive means 20 for driving the oscillating shaft 2 through the agency of a toothed rack 13 engaging with such oscillating shaft and for driving the drive shaft 3 through the agency of a toothed rack 14 engaging with such drive shaft. The drive means 20 has only been shown schematically in the drawing since drive means suitable for the purpose of the invention are set forth in my aforementioned co-pending United States application Serial No. 199,289. Thus, by way of example, and as disclosed in the aforesaid application, such drive means can incorporate a pair of double-acting hydraulic pistons 21 and 22. The hydraulic piston 21 preferably being disposed at substantially right angles to drive shaft 3 for driving the latter via the toothed rack 14, whereas the other hydraulic piston 22 is disposed at substantially right angles to the oscillating shaft 2 for driving the latter via the toothed rack 13. Since details of the drive means are not necessary for understanding the inventive concepts, and further, since the general operation of such double-acting pistons is known to the art and also described in considerable detail in my aforementioned application, no further discussion thereof would appear warranted. At any rate, it should be appreciated that the operating force generated by the double-acting hydraulic pistons 22 and 21 is transmitted via toothed racks 13 and 14 to the oscillating shaft 2 and the drive shaft 3, respectively.

Now, as best seen by inspecting FIGURE 2, each shaft 2 and 3 is provided with at least one tooth 15 which engages with a correspondingly configured toothed gap 16 provided at the respective racks 13 and 14. Since the physical structure of the teeth 15 and toothed gaps 16 is the same for both shafts 2 and 3 and racks 13 and 14, respectively, FIGURE 2 has been accordingly designated to indicate such similarity in structure. The power drive for the hydraulic pistons 21, 22 is regulated such that the force alternately becomes effective during predetermined angular positions of the shaft 2 and 3. During normal operation the swivel arm 11 and the therewith associated operable element or mass execute an oscillatory or reciprocating movement in the direction of the arrows 17, 18.

During a to-and-fro cycle or reciprocation of the swivel arm 11 there occurs a guiding of the opposed ends 6 and 7 of the bolt of pin 5 sliding along the coneshaped openings 8 and 9 respectively, of the bifurcated or forked coupling element 10. For purposes of identification the main positions have been designated at the periphery of the opening 8 by reference characters a, b, c, d. It will be appreciated that points a and c are disposed parallel to the drive shaft 3 and the points b and d parallel to the oscillating shaft 2. In the illustrated embodiment it will further be seen that during such a to-and-fro movement or reciprocation of the swivel arm 11 there occurs a migration or displacement of the contact points between the ends 6 and 7 of the pin member 5 with the periphery or boundary of the openings 8 and 9, respectively, through a complete revolution of the points a, b, c, d, a.

In the drawing there has been depicted the instance where the point of contact of the boundary surfaces of the pin or bolt 5 with the bifurcated member 10 lies at the periphery or boundary surfaces of the opening 8 between the points a and b. During this time the swivel arm 11 moves in the direction of the arrow 17 under the action of the rack 14 driven in the direction of the arrow 19, whereas the drive shaft 3 is moving in the direction of rotation 21. Consequently, the pin end 6 receives an impulse up to position b, thereby moving the oscillating shaft 2 in the direction of rotation 22. At point b the drive shaft 3 has reached dead-center position. On the other hand, the pin 5 continues to move further in consequence of the gyrating mass of the fly weight disk 4 and, in turn, drives the bifurcated member 10 and therewith the shaft 3 in opposition to the rotational direction 21, whereas the force from the hydraulic drive is transmitted through the agency of the rack 13 moving in the direction of the arrow 20. The swivel arm 11 thus moves in the direction of the arrow 18.

As soon as point c has been reached the oscillating shaft 2 comes to standstill whereas the drive shaft 3 continues to move in the same direction, that is contra the direction of rotation 21 and receives its driving force from the rack 14 which is moving opposite the arrow 19. When going from the point c to point d the pin 5 is entrained by the bifurcated member 10 and thereby moves the shaft 2 contra the direction of rotation 22.

After having reached point *d* and therewith the other dead-center location of the drive shaft 3 the oscillating shaft 2 effects further movement of the pin 5 and at the same time the drive of the rack 13 is opposite the direction of the arrow 20. The drive is transmitted to the bifurcated member 10 from the pin 5 in such a manner that the shaft 3 moves in the direction of rotation 21 and the swivel arm 11 in the direction of the arrow 17. When this happens the cycle of the points of contact between pin 5 and bifurcated member 10 have been completed and can continue in the manner heretofore described.

From the foregoing description it will be appreciated that at the points *b*, *d* the drive shaft 3 is at standstill and is located in its dead-center positions into which it is brought by the operable element arranged at the swivel arm 11. At the same time the oscillating shaft 2 in these points *b*, *d* exhibits its greatest moment of gyration or flywheel moment, thereby being in a position to assist reversal of the oscillation of the drive shaft 3. The points *a*, *c* have reference to the dead-center position of the oscillating shaft 2, whereas the drive shaft 3 is then located in the middle of its working movement. The movements of the shafts 2 and 3 are thus mutually displaced in phase 90°.

There should now be considered the situation that during operation a disturbance occurs which, for example, is assumed to be in the form of a jamming of the operable element. This can occur, for example, if a stone or the like becomes clamped between the blades of the mower cutter. Let it be assumed that such a disturbance occurs at a period of time when the point of contact between pin 5 and bifurcated member 10 takes place in accordance with the drawing, that is between the points *a* and *b*. When this happens then the swivel arm 11 and therewith the shaft 3 as well as the bifurcated member 10 are blocked. In consequence thereof, the pin 5 moves without contact with the periphery or boundary surface of the opening along a chord parallel to the line connecting points *a*, *c* until reaching the opposite point at the periphery of the opening 8 since the flyweight 4 of the oscillating shaft 2 is effective. During this movement a reversal of the hydraulic drive has taken place. The drive shaft 3 receives a drive force due to the contact of the pin 5 with the opening 8 at a directly opposite location between points *b* and *c* which moves such shaft opposite to the previous direction of rotation, that is contra arrow 21. As a result, the blades of the mower device open, the stone or other obstruction drops out and the work cycle can continue.

On account of this mode of operation no damage occurs to the blades of the mower device, irrespective of the period of time in the work cycle that the disturbance occurs. The reason for such can be seen from the fact that within a work cycle no accelerated movement occurs, rather only a hydraulic drive is effective. On the other hand, the fly weight or gyrating mass only becomes effective in the region of the dead-center positions of the drive shaft 3 and the mower device during which time the working movement of shaft 3 is null and the blades are stationary, wherefore a clamping of an obstruction cannot occur at all.

It will be recalled that the possibility was mentioned at the outset that variants of the illustrated arrangement were conceivable. For example, it may prove sufficient if only the driving rack 14 is employed for driving the shaft 3, driving rack 13 being omitted, and the necessary energy for assisting reversal of such shaft 3 coming from the fly weight or gyrating mass 4. On the other hand, it may prove sufficient to only employ a driving rack 13 for the oscillating shaft 2 to effect reversal, and thereby omit the use of the gyrating mass 4. Likewise, an arrangement could be effected wherein the shaft 3 is driven as shown by the rack 14, and a gyrating mass, which, for example, could be a flywheel mass such as disk 4 or, in fact, an operable element to be driven, is then mounted upon the oscillating shaft 2, in which case such mass or operable element would provide at the proper time the energy necessary for reversal of the shaft 3. Moreover, drive means constructed and arranged differently than set forth in the mentioned co-pending application can be employed with the drive system of the present invention.

Hence, it should be understood that while there is shown and described a present preferred embodiment of the invention it is to be distinctly understood that the invention is not limited thereto but may be otherwise variously embodied and practised within the scope of the following claims.

What is claimed is:

1. A drive system for reciprocating an operable element, comprising means carrying the operable element for reciprocatory motion, drive means operatively coupled with said carrying means for reciprocating the operable element at a predetermined rate of reciprocatory motion, an oscillatory fly wegiht, means operatively coupling said fly weight to said carrying means for reciprocating said fly weight at said predetermined rate of reciprocatory motion of said operable element and at a predetermined relative phase displacement with respect to the reciprocatory motion of the operable element, said coupling means incorporating at least two cooperating power transmitting coupling elements coacting with one another with play, each of said coupling elements being mounted for movement along a respective path enclosing an angle with regard to one another, one of said coupling elements being provided with a substantially circular hole, the other of said coupling elements incorporating a pin, said pin piercingly extending with play into said circular hole.

2. A drive system for reciprocating an operable element as defined in claim 1 wherein said carrying means includes a shaft member, a given one of said coupling elements being mounted for movement along its respective path at said shaft member, a further shaft member for supporting said fly weight, the remaining coupling element being mounted for movement along its respective path at said further shaft member.

3. A drive system for reciprocating an operable element, comprising means carrying the operable element for reciprocatory motion, drive means operatively coupled with said carrying means for reciprocating the operable element at a predetermined rate of reciprocatory motion, an oscillatory fly weight, means operatively coupling said fly weight to said carrying means for reciprocating said fly weight at said predetermined rate of reciprocatory motion of said operable element and at a predetermined relative phase displacement with respect to the reciprocatory motion of the operable element, said coupling means incorporating at least two cooperating power transmitting coupling elements coacting with one another with play, each of said coupling elements being mounted for movement along a respective path enclosing an angle with regard to one another, one of said coupling elements being provided with a hole, the other of said coupling elements incorporating a pin, said pin piercingly extending with play all around said pin into said hole.

4. A drive system for reciprocating an operable element, comprising means carrying the operable element for reciprocatory motion, drive means operatively coupled with said carrying means for reciprocating the operable element at a predetermined rate of reciprocatory motion, an oscillatory fly weight, means operatively coupling said fly weight to said carrying means for reciprocating said fly weight at said predetermined rate of reciprocatory motion of said operable element and at a predetermined relative phase displacement with respect to the reciprocatory motion of the operable element, said coupling means incorporating at least two cooperating power transmitting coupling elements coacting with one another with play operable in a manner to cause reversal of the reciprocatory motion of the operable element when the latter is prevented by an external force from completing its reciprocatory motion in a given direction.

5. A drive system for reciprocating an operable element as defined in claim 4 including a shaft member for carrying said oscillatory fly weight, one of said coupling elements being supported for movement along a given path at said shaft member carrying said oscillatory fly weight, the other of said coupling elements being supported for movement along a given path at said carrying means for the operable element, said given paths of both coupling elements enclosing an angle with respect to one another.

6. A drive system for reciprocating an operable element as defined in claim 5 further including drive means cooperating with said fly weight for reciprocably driving the latter.

7. A drive system for reciprocating an operable element as defined in claim 5 wherein said two power transmitting coupling elements are a pair of members which interfit with play.

8. A drive system for reciprocating an operable element as defined in claim 7 wherein a given one of said interfitting members is provided with a hole and the other of said interfitting members is a pin which piercingly extends with play at all sides into said hole.

9. A drive system for reciprocating an operable element as defined in claim 8 wherein said one given member is provided with a pair of oppositely situated holes, said pin piercingly extending with play at all sides into both of said oppositely situated holes.

10. A drive system for reciprocating an operable element as defined in claim 8 wherein said hole and pin possess respective boundary surfaces which contact one another in order to transmit power between said two interfitting members.

11. A drive system for reciprocating an operable element as defined in claim 10 wherein said play between said hole and said pin is large enough and said coupling elements are guided for movement along said respective paths in a manner to enable said pin to traverse said hole when said operable element is prevented by an external force from completing its reciprocatory motion in a given direction so that said respective boundary surfaces of said hole and pin come into contact with one another at a location directly opposite the location at which they contacted one another when said operable element moved in said given direction, whereby said operable element has its motion reversed in order to travel in a direction opposite said given direction.

12. A drive system for reciprocating an operable element as defined in claim 10 wherein one of said boundary surfaces is tapered at least at the region where it contacts the other boundrary surface.

13. In combination, a pair of oscillatory shafts positioned for power transmission between one another, means for oscillating at least one of said shafts at a given oscillation frequency, means for operatively coupling said pair of shafts to transmit power from one to the other at the same oscillation frequency but phase displaced with respect to one another, said coupling means incorporating at least two cooperating power transmitting coupling elements coacting with one another with play, one of said coupling elements being supported at one of said shafts for movement along a given path, the other of said coupling elements being supported at the other of said shafts for movement along a given path, said given paths of both coupling elements enclosing an angle with respect to one another.

14. In combination, a pair of oscillatory shafts positioned for power transmission between one another, means for oscillating at least one of said shafts at a given oscillation frequency, means for operatively coupling said pair of shafts to transmit power from one to the other at the same oscillation frequency but phase displaced with respect to one another, said coupling means incorporating at least two power transmitting coupling elements interfitting with play, one of said coupling elements being provided with a hole and supported at one of said shafts for movement along a given path, the other of said coupling elements incorporating a pin piercingly extending with play into said hole, said pin being supported at the other of said shafts for movement along a given path, said given paths of both said hole and said pin enclosing an angle with respect to one another.

References Cited by the Examiner

UNITED STATES PATENTS

| | | | |
|---|---|---|---|
| 847,719 | 3/1907 | Arnold | 287—100 |
| 1,112,747 | 10/1914 | Winge. | |
| 1,789,326 | 1/1931 | Tollerton et al. | 287—100 X |
| 1,935,850 | 11/1933 | Lawson | 287—100 |
| 2,650,106 | 8/1953 | French | 287—93 X |
| 2,957,353 | 10/1960 | Babacz. | |

FOREIGN PATENTS

| | | |
|---|---|---|
| 1,215,004 | 11/1959 | France. |
| 27,030 | 12/1902 | Great Britain. |
| 904,327 | 8/1962 | Great Britain. |
| 485,192 | 10/1953 | Italy. |
| 537,077 | 12/1955 | Italy. |

MILTON KAUFMAN, *Primary Examiner.*

BROUGHTON G. DURHAM, *Examiner.*

D. H. THIEL, *Assistant Examiner.*